(12) United States Patent
Merkel et al.

(10) Patent No.: US 8,004,826 B2
(45) Date of Patent: Aug. 23, 2011

(54) ELECTRICAL SWITCHGEAR ASSEMBLY

(75) Inventors: Hans-Peter Merkel, Schriesheim (DE); Gunnar Zank, Teutschenthal (DE)

(73) Assignee: ABB Patent GmbH, Ladenburg (DE)

( * ) Notice: Subject to any disclaimer, the term of this patent is extended or adjusted under 35 U.S.C. 154(b) by 415 days.

(21) Appl. No.: 11/887,907

(22) PCT Filed: Mar. 25, 2006

(86) PCT No.: PCT/EP2006/002761
§ 371 (c)(1),
(2), (4) Date: Dec. 10, 2008

(87) PCT Pub. No.: WO2006/105878
PCT Pub. Date: Oct. 12, 2006

(65) Prior Publication Data
US 2009/0213532 A1    Aug. 27, 2009

(30) Foreign Application Priority Data
Apr. 7, 2005 (DE) .......................... 10 2005 015 943

(51) Int. Cl.
*H02B 1/20* (2006.01)
(52) U.S. Cl. ........ 361/611; 361/637; 361/639; 361/826; 361/614
(58) Field of Classification Search .................. 361/614, 361/826
See application file for complete search history.

(56) References Cited

U.S. PATENT DOCUMENTS

| | | | | |
|---|---|---|---|---|
| 4,178,624 A | * | 12/1979 | Wilson et al. ................. | 361/611 |
| 4,502,097 A | * | 2/1985 | Takahashi ..................... | 361/614 |
| 4,528,614 A | * | 7/1985 | Shariff et al. ................. | 361/678 |
| 4,602,313 A | | 7/1986 | Takahashi | |

FOREIGN PATENT DOCUMENTS

| | | |
|---|---|---|
| DE | 32 43 063 C2 | 11/1988 |
| DE | 89 11 775.1 U1 | 10/1990 |
| DE | 89 15 073.2 U1 | 5/1991 |
| DE | 43 13 653 A1 | 10/1994 |
| DE | 295 05 243 U1 | 9/1996 |

OTHER PUBLICATIONS

International Search Report, Jun. 15, 2006.
International Search Report.
German Search Report.

* cited by examiner

*Primary Examiner* — Gregory D Thompson
(74) *Attorney, Agent, or Firm* — Buchanan Ingersoll & Rooney PC

(57) ABSTRACT

The invention relates to an electrical switchgear comprising at least one panel, especially for low voltage, a device compartment especially for receiving inserts, switching devices, control devices, and similar, a busbar compartment in which the busbars are accommodated in a horizontal direction, a multi-terminal busbar compartment in which the multi-terminal busbars extend vertically, and at least one wire compartment. The wire compartment for control wires and signal wires is located on one side of the panel while the wire compartment for power wires is placed on the other side of the panel.

7 Claims, 1 Drawing Sheet

ELECTRICAL SWITCHGEAR ASSEMBLY

Figure 1:
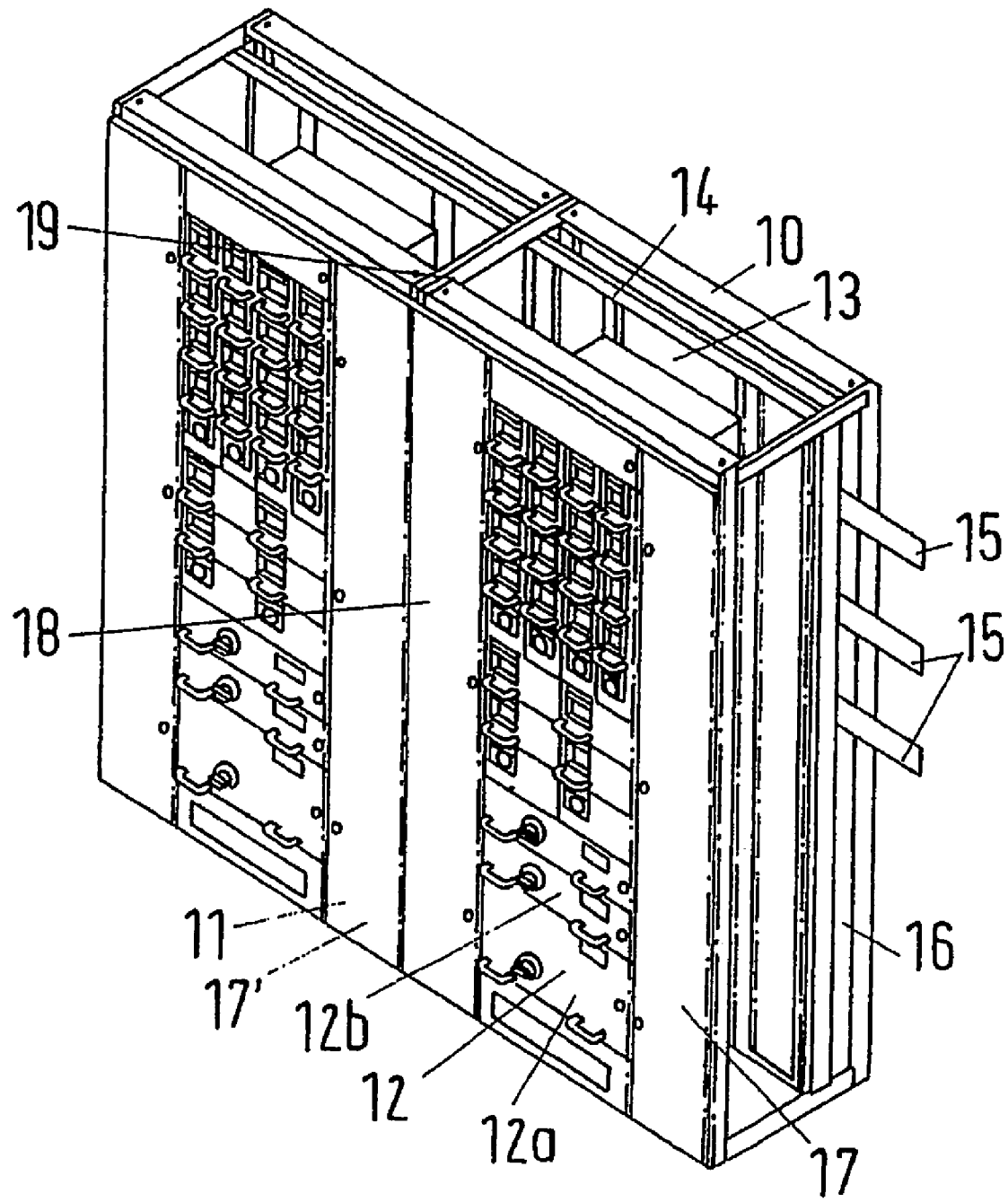

The invention relates to an electrical switchgear assembly in accordance with the precharacterizing clause of claim 1.

Electrical switchgear assemblies have been disclosed which comprise one or more switchpanels. In this case, a busbar or a busbar arrangement, which usually runs horizontally and which is adjoined by distribution busbars, which distribute the electrical energy provided by the busbars to the individual devices, withdrawable parts or the like within the switchpanel, is located in each switchpanel.

Power cables run from the individual devices to the downstream loads; furthermore, control and signal cables are provided, with which electrical signals are transmitted to switching devices located within the switchpanel, as well as further signal cables, with which signals originating from the individual switching devices and control devices are transmitted to a control center. These control and signal cables can also be in the form of a bus line.

In the known switchgear assemblies, in addition to the device area, in which the switching devices and control devices are located, a cable area is provided, in which both the power cables and the control and signal cables are laid. This results in problems in cable routing for power and control cables, and furthermore technically complex modifications to the embodiment known to date are necessary for meeting certain standards (Form 4 b/7).

The object of the invention is to provide an electrical switchgear assembly having at least one switchpanel, in which the cable routing of power and control cables is simplified without technically complex modifications being necessary.

This object is achieved according to the invention by the features of claim 1.

According to the invention, the cable area for the control and signal cables (referred to as the control cable area below for short) is arranged on one side of the switchpanel and the cable area for the power cables (referred to as the power cable area below for short) is arranged on the other side of the switchpanel.

Optimum isolation of the control cable area and the power cable area is therefore produced; the isolation takes place via the device area.

If two switchpanels or more are arranged next to one another, the control cable area of one switchpanel adjoins the power cable area of the other switchpanel; the two initially form a common cable area, in which the individual cables can then be laid isolated from one another. Once the fitting and laying of the cables is complete, the control and power cable areas lying next to one another are isolated from one another by means of an insertable partition wall, with the result that, on the one hand, mutual influencing does not take place, which naturally also applies to the control and power cable areas of a switchpanel. The partition wall which is inserted after routing and laying of the cables is then the lateral boundary wall of a switchpanel.

Further advantageous configurations and improvements of the invention are described in the further dependent claims.

The invention as well as further advantageous configurations and improvements of the invention and further advantages will be explained and described in more detail with reference to the drawing, which illustrates an exemplary embodiment of the invention and in which:

the single FIG. shows a perspective view of a switchgear assembly, in a schematic illustration.

The switchgear assembly has a first switchpanel 10, to which a second switchpanel 11, which is only partially illustrated, is connected. A device area 12, in which the switching devices and control devices are accommodated which can be installed in differently sized withdrawable parts 12a, 12b, is located in the switchpanel 10. Positioned adjacent, behind the device area 12, isolated by a partition wall 13, is a distribution busbar area 14, in which vertically running distribution busbars are arranged which are electrically conductively connected to busbars 15, which are accommodated in a busbar area 16. Outgoing cables (not illustrated) and power cables are laid from the devices 12 into a power cable area 17, from where they are led to motors and other loads arranged behind the switchpanel. This cable area 17 is to the right of the device area 12 of the switchpanel 10. To the left of this device area 12 there is a cable-routing area 18, in which signal cables and control cables as well as a bus line are accommodated, with which control signals and, for example, state signals are fed to the devices in the individual withdrawable parts.

If two switchpanels 10 and 11 are arranged next to one another, the power cable area 17' of the switchpanel 11 is next to the control cable area 18 of the switchpanel 10; in order to install and lay the power and control cables, it is possible, as is the case here, for the two cable areas 17' and 18 to form a single area, which means a simplification of the installation for the laying process; once laying of the cables is complete, a partition wall 19 can be inserted between the power cable area 17' and the control cable area 18, as a result of which isolation of the two cable areas is achieved.

It is naturally also possible to pass the power cables out of the switchpanel through the rear wall.

The partition wall therefore provides for mechanical and electrical isolation of the power and control cable areas.

The invention claimed is:

1. An electrical switchgear assembly comprising:
at least one switchpanel;
a device area for accommodating withdrawable parts, the withdrawal parts having at least one of switching devices and control devices installed therein;
a busbar area including a plurality of busbars arranged in a first direction;
a distribution busbar area including a plurality of distribution busbars arranged in a second direction substantially perpendicular to the first direction;
at least one cable area for accommodating control and signal cables; and
at least one cable area for accommodating power cables,
wherein the cable area for control and signal cables is located on one side of the switchpanel, and the cable area for power cables is located on the other side of the switchpanel opposite to the one side of the switchpanel on which the cable area for control and signal cables is located.

2. An electrical switchgear assembly comprising:
at least two switchpanels arranged next to one another, each of the switchpanels including at least one cable area for accommodating control and signal cables, and at least one cable area for accommodating power cables, respectively,
wherein the switchgear assembly comprises an insertable partition wall configured to isolate the cable area for control and signal cables of a first one of the switchpanels from the cable area for power cables of a second one of the panel switchpanels arranged next to the first one of the switchpanels, once the cables have been installed and laid in adjacent cable areas of the first and second switchpanels.

3. The electrical switchgear assembly as claimed in claim 1, wherein the distribution busbar area is provided directly adjacent to the busbar area.

4. The electrical switchgear assembly as claimed in claim 2, wherein the distribution busbar area is provided directly adjacent to the busbar area.

5. The electrical switchgear assembly as claimed in claim 1, wherein the at least one switchapanel is configured for low voltages.

6. The electrical switchgear assembly as claimed in claim 2, wherein at least one of the switchpanels is configured for low voltages.

7. An electrical switchgear assembly comprising:
   at least two switchpanels arranged next to one another, each of the switchpanels including at least one cable area for accommodating control and signal cables, and at least one cable area for accommodating power cables, respectively,
   wherein for each switchpanel, the cable area for control and signal cables is located on a first side of the switchpanel, and the cable area for power cables is located on a second side of the switchpanel opposite to the first side of the switchpanel, respectively, such that the cable area for control and signal cables of a first one of the switchpanels is arranged adjacent to the cable area for power cables of a second one of the switchpanels arranged next to the first one of the switchpanels, and
   wherein the switchgear assembly comprises an insertable partition wall configured to isolate the cable area for control and signal cables of the first one of the switchpanels from the cable area for power cables of the second one of the panel switchpanels, once the cables have been installed and laid in the adjacent cable areas.

* * * * *